United States Patent
Yu et al.

(10) Patent No.: US 11,733,575 B2
(45) Date of Patent: Aug. 22, 2023

(54) LIQUID CRYSTAL DISPLAY DEVICE

(71) Applicant: LG DISPLAY CO., LTD., Seoul (KR)

(72) Inventors: Ji-Hoon Yu, Paju-si (KR); Hye-Ji Jeon, Paju-si (KR); Kyoung-Seok Park, Paju-si (KR); Key-Young Yang, Paju-si (KR); Si-Hyun Kim, Paju-si (KR); Hyun-Ho Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 35 days.

(21) Appl. No.: 17/466,471

(22) Filed: Sep. 3, 2021

(65) Prior Publication Data

US 2022/0197070 A1 Jun. 23, 2022

(30) Foreign Application Priority Data

Dec. 23, 2020 (KR) .......................... 10-2020-0181978

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136222* (2021.01)

(58) Field of Classification Search
CPC .................... G02F 1/136209; G02F 1/133512
See application file for complete search history.

(56) References Cited

U.S. PATENT DOCUMENTS

| | | | | |
|---|---|---|---|---|
| 2005/0052603 A1* | 3/2005 | Jin | ..................... | G02F 1/134363 |
| | | | | 349/141 |
| 2005/0134764 A1* | 6/2005 | Jeoung | .............. | G02F 1/133512 |
| | | | | 349/110 |
| 2006/0227257 A1* | 10/2006 | Do | ........................ | G02F 1/1335 |
| | | | | 349/40 |
| 2009/0109363 A1* | 4/2009 | Yu | ..................... | G02F 1/134309 |
| | | | | 349/187 |
| 2012/0050654 A1* | 3/2012 | Kim | ........................ | G06F 3/042 |
| | | | | 257/435 |
| 2013/0088672 A1* | 4/2013 | Shin | ...................... | G02F 1/1345 |
| | | | | 349/110 |
| 2013/0141678 A1* | 6/2013 | Chin | ................. | G02F 1/133345 |
| | | | | 445/24 |

(Continued)

FOREIGN PATENT DOCUMENTS

| | | |
|---|---|---|
| KR | 10-2007-0069410 A | 7/2007 |
| KR | 10-2013-0069971 A | 6/2013 |
| KR | 10-2014-0087825 A | 7/2014 |

(Continued)

*Primary Examiner* — Michael H Caley
*Assistant Examiner* — Jonathan Y Jung
(74) *Attorney, Agent, or Firm* — Polsinelli PC

(57) ABSTRACT

A liquid crystal display device includes first and second substrates facing and spaced apart from each other; a liquid crystal layer between the first and second substrates; a thin film transistor in a subpixel on an inner surface of first substrate; a pixel electrode connected to the thin film transistor; a common electrode generating an electric field with the pixel electrode; a black matrix in a border portion of the subpixel on an inner surface of the second substrate, the black matrix including a metallic material, and a voltage applied to the black matrix; and a color filter layer in a center portion of the subpixel on the black matrix.

16 Claims, 10 Drawing Sheets

(56) References Cited

U.S. PATENT DOCUMENTS

2017/0097543 A1\* 4/2017 Kang .................. H01L 27/1225
2019/0244975 A1\* 8/2019 He ........................ G02F 1/1368

FOREIGN PATENT DOCUMENTS

| KR | 10-2016-0066494 A | 6/2016 |
| KR | 10-2018-0028821 A | 3/2018 |
| WO | WO 2015001896 | 1/2015 |

\* cited by examiner

LIQUID CRYSTAL DISPLAY DEVICE

CROSS-REFERENCE TO RELATED APPLICATION

The present application claims the priority benefit of Korean Patent Application No. 10-2020-0181978 filed on Dec. 23, 2020, which is hereby incorporated by reference in its entirety.

BACKGROUND

Field of the Disclosure

The present disclosure relates to a liquid crystal display device, and more particularly, to a liquid crystal display device capable of reducing black luminance and increasing a contrast ratio by applying a voltage to a black matrix of a metallic material.

Description of the Background

In general, a liquid crystal display (LCD) device includes an array substrate and a color filter substrate facing and spaced apart from each other and a liquid crystal layer between the array substrate and the color filter substrate. The LCD device displays an image by adjusting a voltage applied to a pixel electrode and a common electrode.

Since the LCD device does not have an emissive type, the LCD device includes a liquid crystal panel and a backlight unit supplying a light to the liquid crystal panel.

Although the LCD device where the color filter substrate having a color filter layer is disposed adjacent to a user has been widely fabricated, the LCD device where the array substrate having a thin film transistor is disposed adjacent to a user has been recently developed.

In the LCD device where the array substrate is disposed adjacent to a user, since the array substrate greater than the color filter substrate is disposed at an outermost portion and a driving part is disposed under the array substrate, a borderless structure where a bezel of four sides may be obtained.

However, in the LCD device where the array substrate is disposed adjacent to a user, since a black matrix of the color filter substrate is disposed adjacent to the backlight unit, a transmittance is reduced.

To solve the above problem, when a luminance of a light supplied from the backlight unit increases, a power consumption increases.

SUMMARY

Accordingly, the present disclosure is directed to a liquid crystal display device that substantially obviates one or more of the problems due to limitations and disadvantages of the related art.

Also, the present disclosure is to provide a liquid crystal display device where a transmittance and a luminance increase by recycling a light of a backlight unit due to a black matrix of a metallic material.

In addition, the present disclosure is to provide a liquid crystal display device where a black luminance is reduced and a contrast ratio increases by applying a voltage to a black matrix of a metallic material.

Further, the present disclosure is to provide a liquid crystal display device where a contact resistance is reduced and a voltage is stably applied to a black matrix by contacting a top surface of a black matrix and a connecting pattern.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a liquid crystal display device includes: first and second substrates facing and spaced apart from each other; a liquid crystal layer between the first and second substrates; a thin film transistor in a subpixel on an inner surface of first substrate; a pixel electrode connected to the thin film transistor; a common electrode generating an electric field with the pixel electrode; a black matrix in a border portion of the subpixel on an inner surface of the second substrate, the black matrix including a metallic material, and a voltage applied to the black matrix; and a color filter layer in a center portion of the subpixel on the black matrix.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Figure 1:
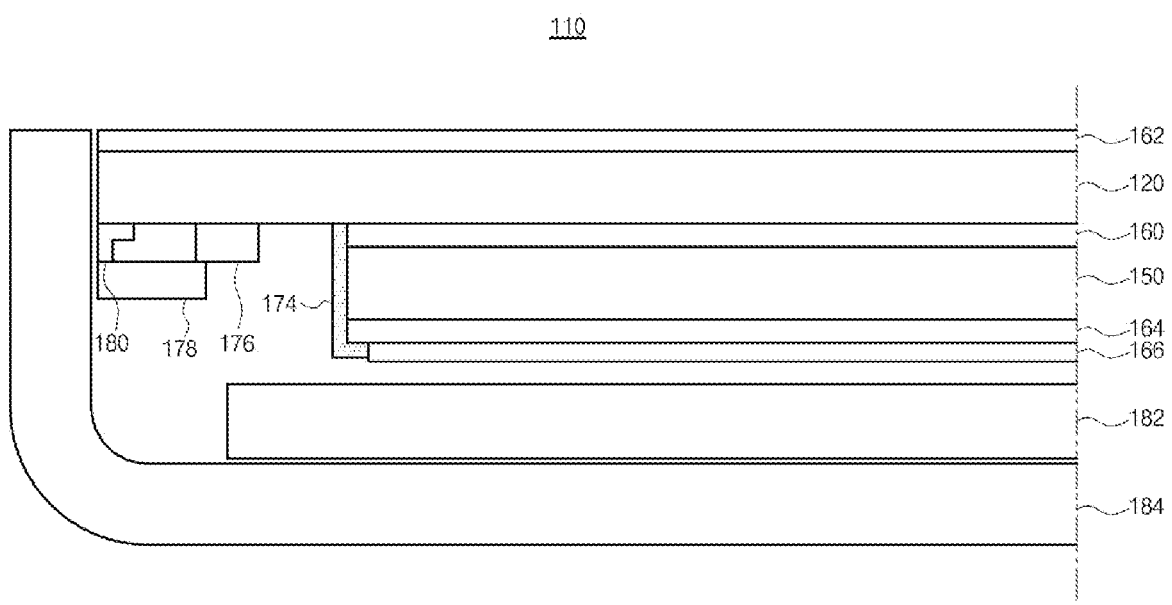
FIG. 1 is a cross-sectional view showing a liquid crystal display device according to a first aspect of the present disclosure.

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing aspects of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of aspects, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and aspects of the present disclosure are not limited thereto.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Reference will now be made in detail to the present disclosure, examples of which are illustrated in the accompanying drawings.

Figure 2:
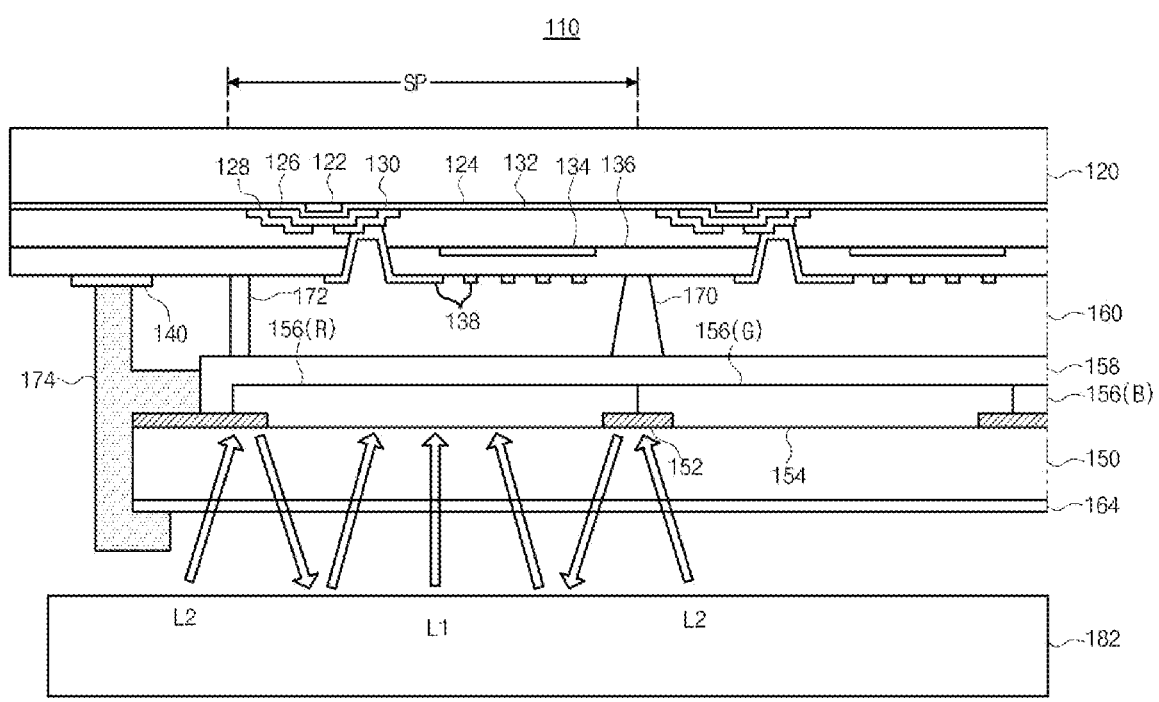
FIG. 2 is a cross-sectional view showing a liquid crystal panel and a backlight unit of a liquid crystal display device according to a first aspect of the present disclosure.

FIG. 1 is a cross-sectional view showing a liquid crystal display device according to a first aspect of the present disclosure, and FIG. 2 is a cross-sectional view showing a liquid crystal panel and a backlight unit of a liquid crystal display device according to a first aspect of the present disclosure.

In FIGS. 1 and 2, a liquid crystal display (LCD) device 110 according to a first aspect of the present disclosure includes a liquid crystal panel displaying an image, a backlight unit 182 under the liquid crystal panel and supplying a light to the liquid crystal panel, and a frame 184 surrounding and supporting the liquid crystal panel and the backlight unit 182.

The liquid crystal panel includes first and second substrates 120 and 150 facing and spaced apart from each other, and a liquid crystal layer 160 between the first and second substrates 120 and 150.

A gate electrode 122 is disposed in each subpixel SP on an inner surface of the first substrate 120, and a gate insulating layer 124 is disposed on the gate electrode 122 and an entire surface of the first substrate 120.

A semiconductor layer 126 is disposed on the gate insulating layer 124 over the gate electrode 122, and a source electrode 128 and a drain electrode 130 are disposed on the semiconductor layer 126. The source electrode 128 and the drain electrode 130 contact both end portions of the semiconductor layer 126 and are spaced apart from each other.

The gate electrode 122, the semiconductor layer 126, the source electrode 128 and the drain electrode 130 constitute a thin film transistor (TFT).

Although not shown, a gate line and a data line are disposed on the inner surface of the first substrate 120. The gate line and the data line cross each other to define a subpixel SP, and the TFT is connected to the gate line and the data line.

A passivating layer 132 is disposed on the TFT and an entire surface of the first substrate 120, and a common electrode 134 of a plate shape is disposed in each subpixel SP on the passivating layer 132.

A planarizing layer 136 is disposed on the common electrode 134 and an entire surface of the first substrate 120, and a pixel electrode 138 of a shape of a plurality of bars is disposed in each subpixel SP on the planarizing layer 136. The pixel electrode 138 is connected to the drain electrode 130 through a contact hole of the planarizing layer 136 and the passivating layer 132.

A common voltage is applied to the common electrode 134, and a data voltage is applied to the pixel electrode 138. As a result, a horizontal electric field is generated between the common electrode 134 and the pixel electrode 138.

A connecting electrode 140 is disposed in an edge portion of the first substrate 120 on the planarizing layer 136.

A black matrix 152 is disposed in a border portion of each subpixel SP on an inner surface of the second substrate 150, and a color filter layer 156 is disposed in a center portion of each subpixel SP on the second substrate 150 and the black matrix 152.

The black matrix 152 may include a metallic material such as chromium (Cr), and the color filter layer 156 may include red, green and blue (RGB) color filters.

An overcoating layer 158 is disposed on the color filter layer 156 and an entire surface of the second substrate 150, and a spacer 170 is disposed in a border portion of each subpixel SP on the overcoating layer 158.

The overcoating layer 158 exposes the black matrix 152 in an edge portion of the second substrate 150, and the spacer 170 contacts the planarizing layer 136 on the first substrate 120 to maintain a gap between the first and second substrates 120 and 150.

The overcoating layer 158 exposing the black matrix 152 may be formed through forming a photosensitive overcoating material layer by coating a photosensitive overcoating material on an entire surface of the second substrate 150 having the color filter layer 156 and exposing and developing the photosensitive overcoating material layer using a photomask blocking a center portion of the second substrate 150 and exposing an edge portion of the second substrate 150. Alternatively, the overcoating layer 158 exposing the black matrix 152 may be formed through forming an overcoating material layer and a photoresist layer by sequentially coating an overcoating material and a photoresist on an entire surface of the second substrate 150 having the color filter layer 156, forming a photoresist pattern by exposing and developing the photoresist layer using a photomask blocking a center portion of the second substrate 150 and exposing an edge portion of the second substrate 150, and patterning the overcoating material layer using the photoresist pattern as an etch mask.

A seal pattern 172 is disposed in an edge portion of the second substrate 150 on the overcoating layer 158. The seal pattern 172 prevents a leakage of a liquid crystal of the liquid crystal layer 160.

A first polarizing plate 162 is disposed on an outer surface of the first substrate 120. A discharging electrode 164 is disposed on an outer surface of the second substrate 150, and a second polarizing plate 166 is disposed on the discharging electrode 164.

The discharging electrode 164 is connected to the connecting electrode 140 through a connecting pattern 174 to discharge a static electricity generated in a fabrication process, and the connecting pattern 174 contacts a top surface of the black matrix 152 exposed through the overcoating layer 158.

The first substrate 120 is greater than the second substrate 150, and a driving integrated circuit (IC) 176 is disposed on the first substrate 120 exposed outside the second substrate 150. A flexible printed circuit (FPC) 180 connected to the driving IC 176 is disposed in an edge portion of the first substrate 120, and a printed circuit board (PCB) 178 connected to the FPC 180 is disposed on the FPC 180.

The PCB 178 may include a timing controlling part, and an image data, a gate control signal and a data control signal of the timing controlling part may be transmitted to the driving IC 176 through the FPC 180. The driving IC 176 may generate a gate voltage using the gate control signal and may supply the gate voltage to the gate line of the liquid crystal panel. The driving IC 176 may generate a data voltage using the image data and the data control signal and may supply the data voltage to the data line of the liquid crystal panel.

The backlight unit 182 may be disposed under the second substrate 150 and may include a light source and an optical sheet. In a direct type, a diffusing sheet may be disposed between the light source and the optical sheet. In an edge type, a light guide plate may be disposed between the light source and the optical sheet, and the optical sheet may include a prism sheet and a diffusing sheet.

In the LCD device 110, a light of the backlight unit 182 is recycled due to the black matrix 152 of a metallic material.

A first light L1 emitted from the backlight unit 182 to a center portion of the subpixel SP between black matrixes 152 passes through the liquid crystal panel and is transmitted to a user at front of the first substrate 120 to be used for an image display.

A second light L2 emitted from the backlight unit 182 to the black matrix 152 in a boundary portion of the subpixel SP is reflected by the black matrix 152 and is transmitted to the backlight unit 182. Next, the second light L2 is reflected by the backlight unit 182 and is transmitted to a center portion of the subpixel SP between the black matrixes 152. Next, the second light L2 passes through the liquid crystal panel and is transmitted to a user at front of the first substrate 120 to be used for an image display.

Since the second light L2 capable of being reflected by the black matrix 152 and dissipated is also used for an image display, a transmittance and a luminance of the LCD device 110 increase. In addition, a power consumption of the LCD device 110 is reduced by reducing a luminance of a light supplied by the backlight unit 182.

An optical characteristic of the LCD device 110 will be illustrated hereinafter.

Figure 3A:
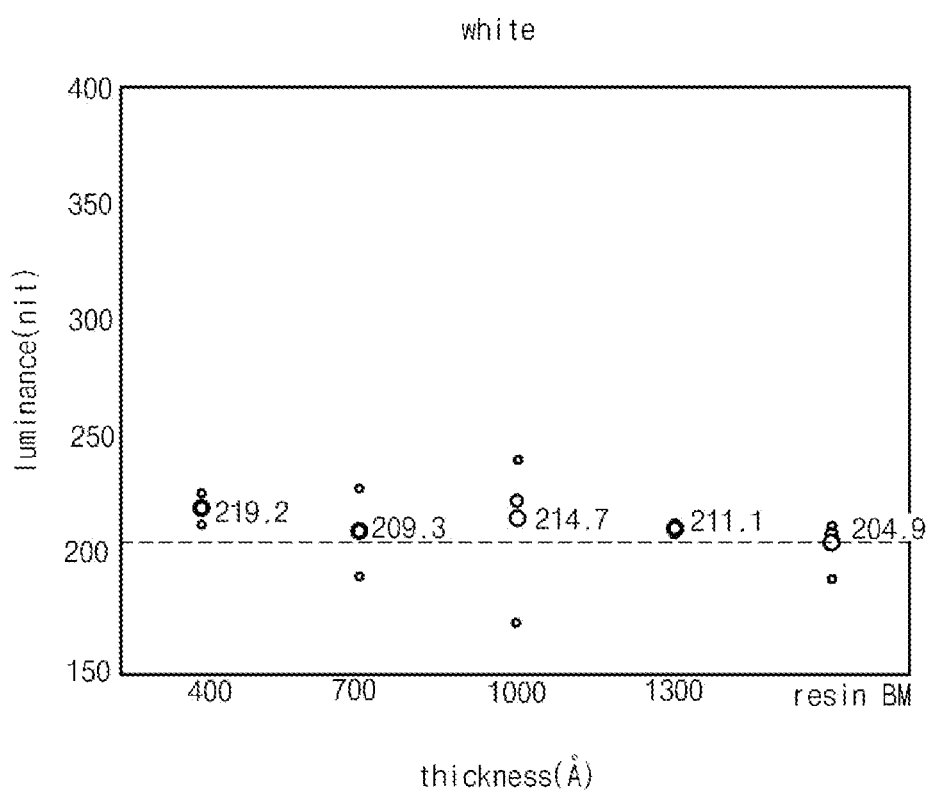
FIG. 3A is a graph showing a luminance of a white with respect to a thickness of a black matrix of a liquid crystal display device according to a first aspect of the present disclosure.
Figure 3B:
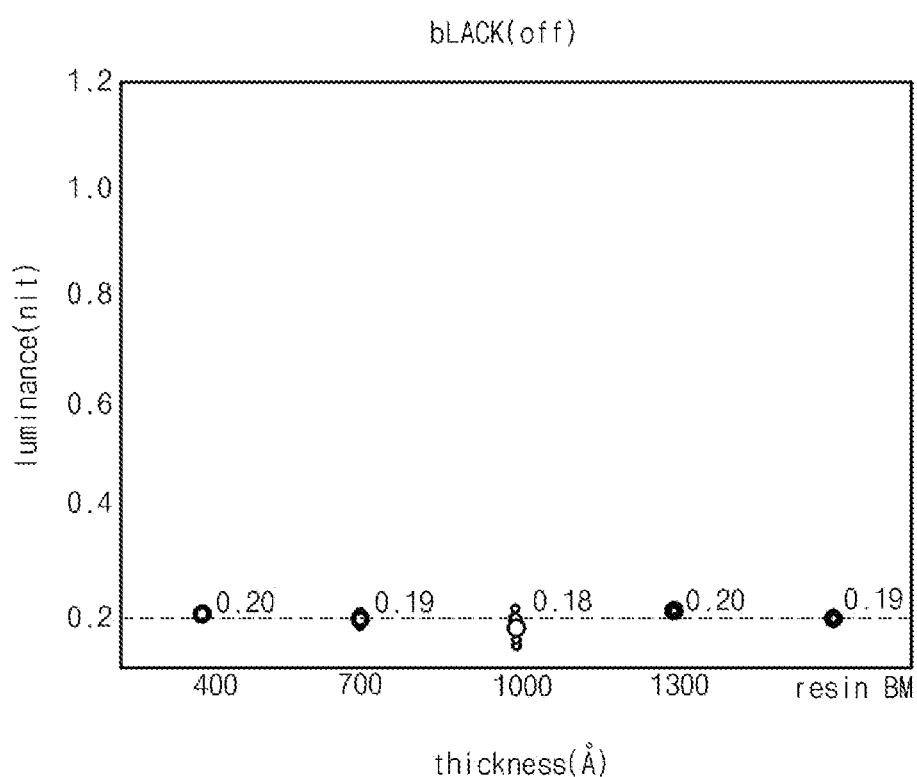
FIG. 3B is a graph showing a luminance of an off-black with respect to a thickness of a black matrix of a liquid crystal display device according to a first aspect of the present disclosure.
Figure 3C:
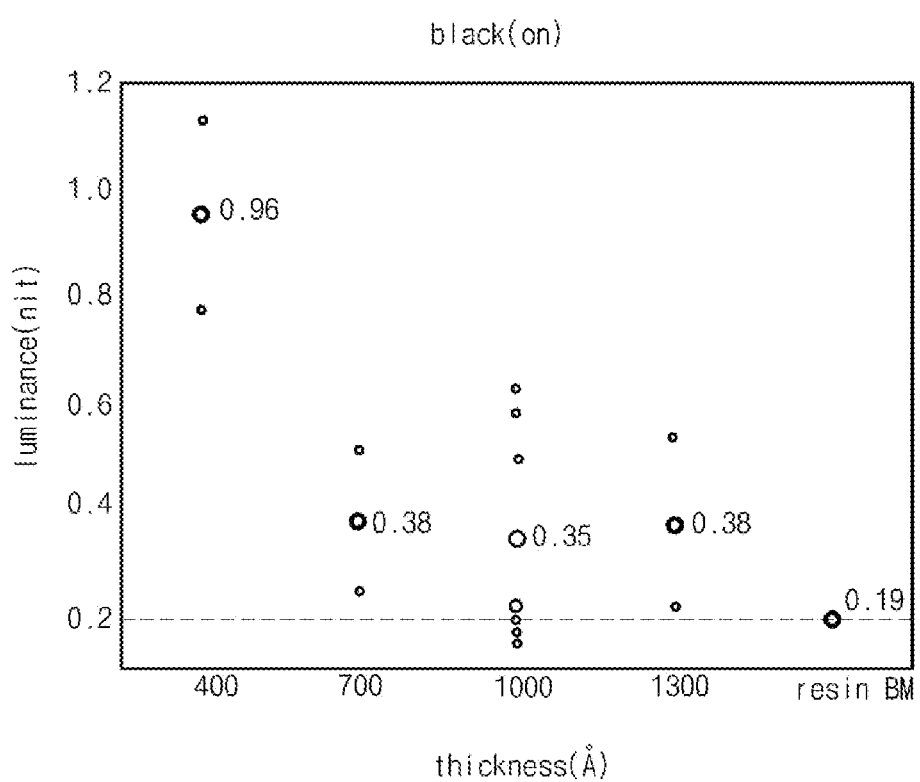
FIG. 3C is a graph showing a luminance of an on-black with respect to a thickness of a black matrix of a liquid crystal display device according to a first aspect of the present disclosure.

FIGS. 3A, 3B and 3C are graphs showing a luminance of a white, a luminance of an off-black and a luminance of an on-black, respectively, with respect to a thickness of a black matrix of a liquid crystal display device according to a first aspect of the present disclosure.

In FIG. 3A, when thicknesses of the black matrix 152 of a metallic material of the LCD device 110 according to a first aspect of the present disclosure are about 400 Å, about 700 Å, about 1000 Å and about 1300 Å, luminance of a white of the LCD device 110 is about 219.2 nit, about 209.3 nit, about 214.7 nit and about 211.1 nit, respectively. The luminance of a white of the LCD device 110 is greater than a luminance of about 204.9 nit of a white of an LCD device having a black matrix of a resin according to a comparison example.

In FIG. 3B, when thicknesses of the black matrix 152 of a metallic material of the LCD device 110 according to a first aspect of the present disclosure are about 400 Å, about 700 Å, about 1000 Å and about 1300 Å, luminance of an off-black (non-driving black) of the LCD device 110 are about 0.20 nit, about 0.19 nit, about 0.18 nit and about 0.20 nit, respectively. The luminance of an off-black of the LCD device 110 is similar to luminance of about 0.19 nit of an off-black of an LCD device having a black matrix of a resin according to a comparison example.

The off-black corresponds to a state where a common voltage and a data voltage are not applied to the common electrode 134 and the pixel electrode 138, respectively, in each subpixel SP of the LCD device 110.

In FIG. 3C, when thicknesses of the black matrix 152 of a metallic material of the LCD device 110 according to a first aspect of the present disclosure are about 400 Å, about 700 Å, about 1000 Å and about 1300 Å, luminance of an on-black (driving black) of the LCD device 110 are about 0.96 nit, about 0.38 nit, about 0.35 nit and about 0.38 nit, respectively. The luminance of an on-black of the LCD device 110 are greater than a luminance of about 0.19 nit of an on-black of an LCD device having a black matrix of a resin according to a comparison example.

The on-black corresponds to a state where a common voltage and a data voltage are applied to the common electrode 134 and the pixel electrode 138, respectively, in each subpixel SP of the LCD device 110 to display an image.

The LCD device 110 having the black matrix 152 of a metallic material has a greater white luminance by about 5% and a similar off-black luminance as compared with the LCD device having the black matrix of a resin. Further, the LCD device 110 having the black matrix 152 of a metallic material has a greater on-black luminance as compared with the LCD device having the black matrix of a resin.

Increase of the on-black luminance is caused by a light leakage. A strong vertical electric field is generated between the black matrix 152 of a metallic material floated or grounded and the pixel electrode 138 where the data voltage is applied, and a horizontal electric field between the pixel electrode 138 and the common electrode 134 is distorted by the strong vertical electric field. The liquid crystal molecule of the liquid crystal layer 160 adjacent to the black matrix 152 is re-aligned to generate a light leakage.

To minimize the light leakage, in the LCD device 110 according to a first aspect of the present disclosure, a voltage is applied to the black matrix 152 of a metallic material to weaken the vertical electric field generated between the black matrix 152 and the pixel electrode 138 and to minimize distortion of the horizontal electric field between the pixel electrode 138 and the common electrode 134.

Figure 4A:
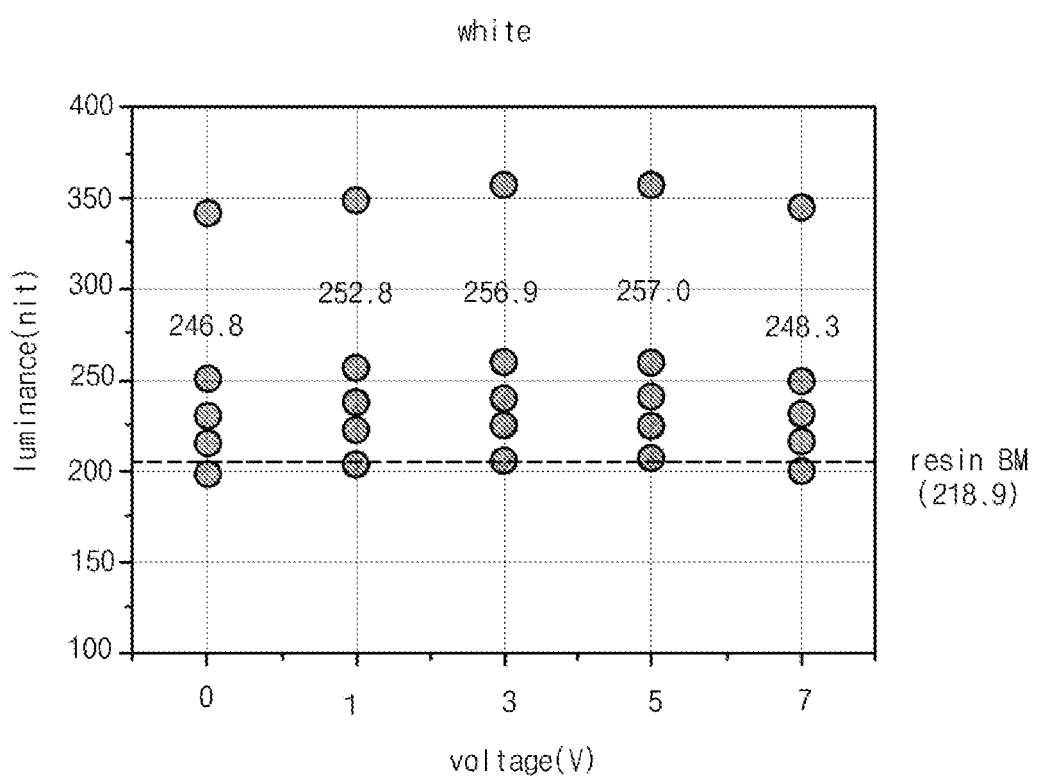
FIG. 4A is a graph showing a luminance of a white with respect to a voltage applied to a black matrix of a liquid crystal display device according to a first aspect of the present disclosure.
Figure 4B:
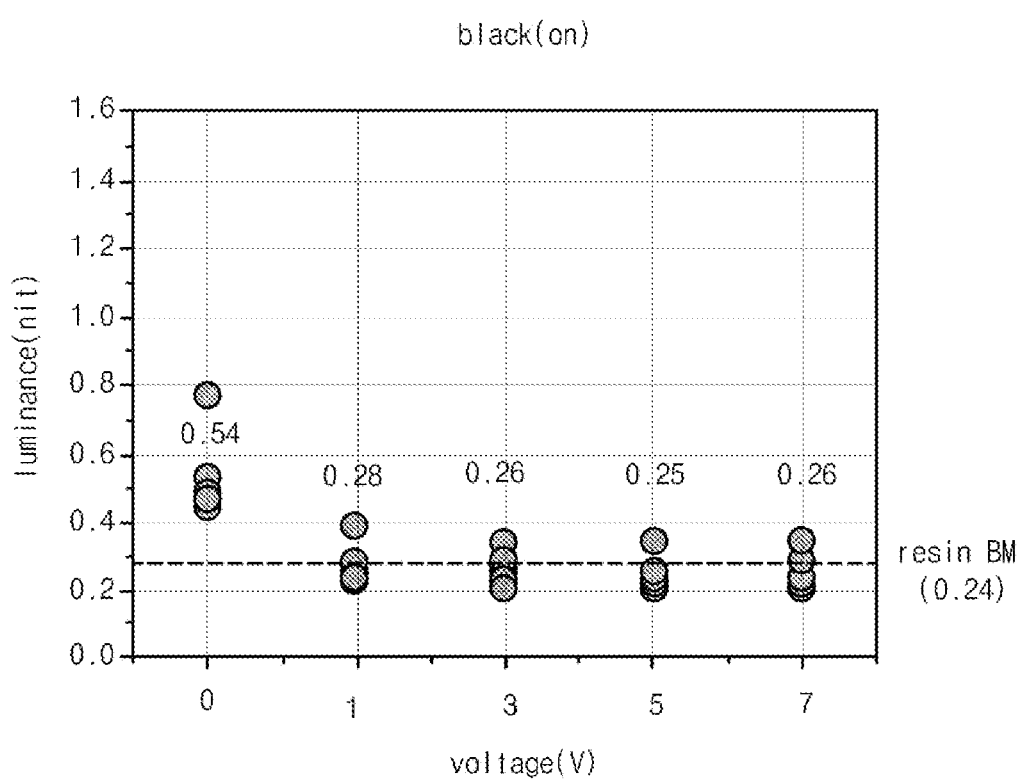
FIG. 4B is a graph showing a luminance of a black with respect to a voltage applied to a black matrix of a liquid crystal display device according to a first aspect of the present disclosure.
Figure 4C:
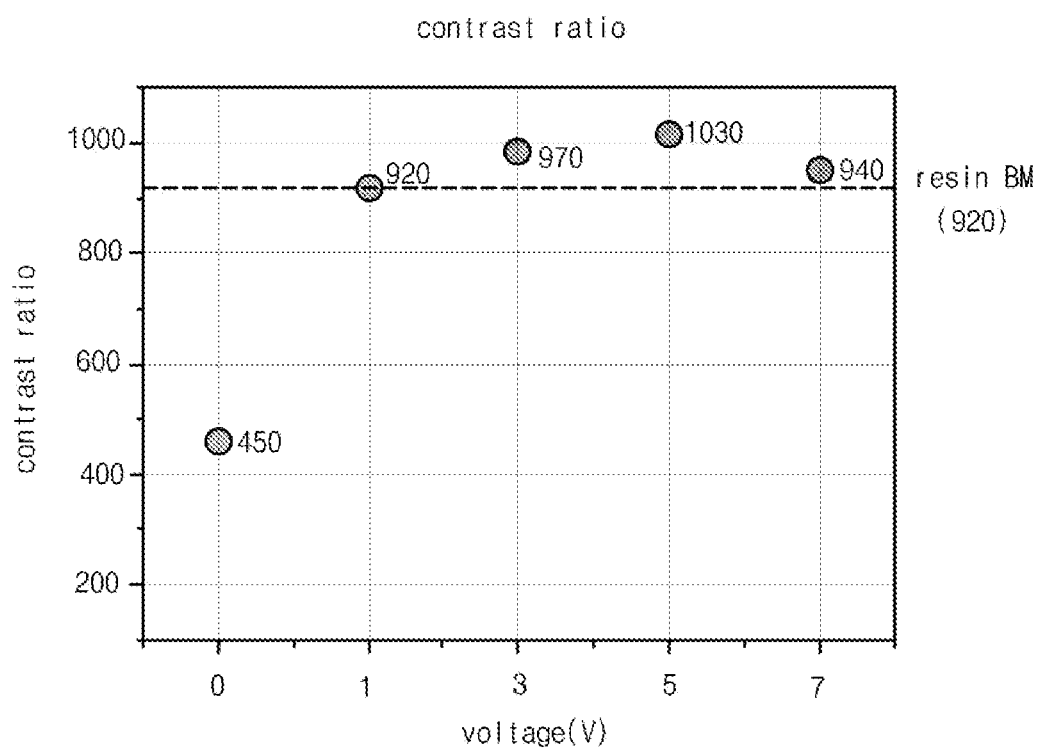
FIG. 4C is a graph showing a contrast ratio with respect to a voltage applied to a black matrix of a liquid crystal display device according to a first aspect of the present disclosure.

FIGS. 4A, 4B and 4C are graphs showing a luminance of a white, a luminance of a black and a contrast ratio, respectively, with respect to a voltage applied to a black matrix of a liquid crystal display device according to a first aspect of the present disclosure.

In FIG. 4A, when voltages applied to the black matrix 152 of a metallic material of the LCD device 110 according to a first aspect of the present disclosure are about 0 V, about 1 V, about 3 V, about 5 V and about 7 V, luminance of a white of the LCD device 110 are about 246.8 nit, about 252.8 nit, about 256.9 nit, about 257.0 nit and about 248.3 nit, respectively. The luminance of a white of the LCD device 110 are greater than a luminance of about 218.9 nit of a white of an LCD device having a black matrix of a resin according to a comparison example.

In FIG. 4B, when a voltage applied to the black matrix of a metallic material of the LCD device 110 according to a first aspect of the present disclosure is about 0 V (ground), a luminance of an on-black (driving black) of the LCD device 110 is about 0.54 nit. The luminance of an on-black of the LCD device 110 is greater than a luminance of about 0.24 nit of an off-black of an LCD device having a black matrix of a resin according to a comparison example.

When voltages applied to the black matrix 152 of a metallic material of the LCD device 110 according to a first aspect of the present disclosure are about 1 V, about 3 V, about 5 V and about 7 V, luminance of an on-black (driving black) of the LCD device 110 are about 0.28 nit, about 0.26 nit, about 0.25 nit and about 0.26 nit, respectively. The luminance of an on-black of the LCD device 110 are similar to a luminance of about 0.24 nit of an off-black of an LCD device having a black matrix of a resin according to a comparison example.

In FIG. 4C, when a voltage of the black matrix 152 of a metallic material of the LCD device 110 according to a first aspect of the present disclosure is about 0 V (ground), a contrast ratio of the LCD device 110 is about 450. The contrast ratio of the LCD device 110 is smaller than a contrast ratio of about 920 of an LCD device having a black matrix of a resin according to a comparison example.

When voltages applied to the black matrix 152 of a metallic material of the LCD device 110 according to a first aspect of the present disclosure are about 1 V, about 3 V, about 5 V and about 7 V, contrast ratios of the LCD device 110 are about 920, about 970, about 1030 and about 940, respectively. The contrast ratios of the LCD device 110 are greater than or equal to a contrast ratio of about 920 of an LCD device having a black matrix of a resin according to a comparison example.

To weaken an electric field generated between the black matrix 152 and the pixel electrode 138, the voltage applied to the black matrix 152 may be smaller than or equal to 50% of a maximum value of the data voltage applied to the pixel electrode 138 considering a distance between the black matrix 152 and the pixel electrode 138.

The voltage applied to the black matrix 152 may be supplied to the black matrix 152 of the second substrate 150 from the connecting electrode 140 of the first substrate 120 through the connecting pattern 174.

In the LCD device 110 having the black matrix 152 of a metallic material, since the voltage smaller than or equal to 50% of a maximum value of the data voltage applied to the pixel electrode 136 for driving the subpixel SP is applied to the black matrix 152, a vertical electric field generated between the black matrix 152 and the pixel electrode 138 is weaken to minimize distortion of a horizontal electric field between the pixel electrode 138 and the common electrode 134. As a result, a light leakage in periphery of the black matrix 152 is minimized to reduce a luminance of an on-black and a contrast ratio increases.

Further, since the connecting pattern 174 contacts a top surface of the black matrix 152 exposed through the overcoating layer 158, a contact area increases to reduce a contact resistance and a voltage is stably applied to the black matrix 152.

An image sticking and a flicker are improved by applying a voltage to the black matrix 152.

Figure 5:
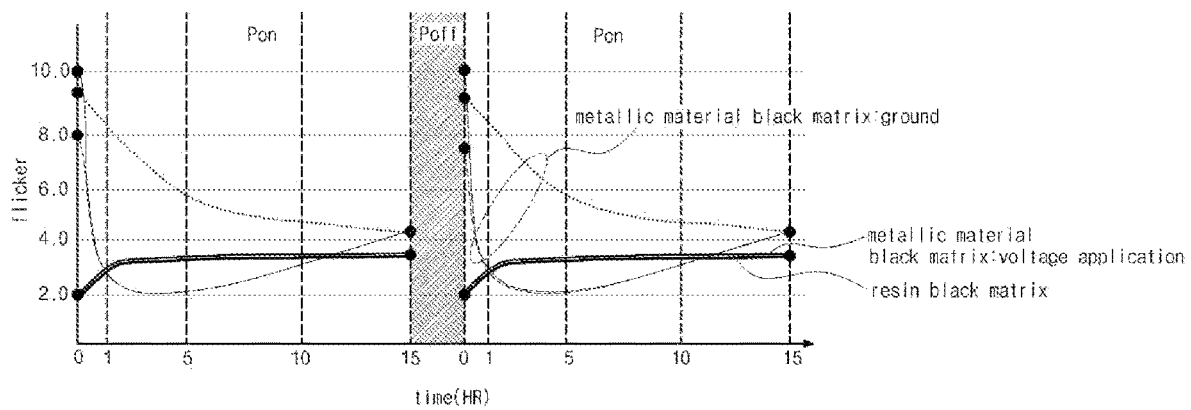
FIG. 5 is a graph showing a flicker with respect to a driving time of a liquid crystal display device according to a first aspect of the present disclosure.

FIG. 5 is a graph showing a flicker with respect to a driving time of a liquid crystal display device according to a first aspect of the present disclosure.

In FIG. 5, when the black matrix 152 of a metallic material of a liquid crystal display (LCD) device 110 according to a first aspect of the present disclosure is grounded (0 V), a flicker has a relatively high value (about 8.0~about 10.0) in an initial range of a driving period Pon of the subpixel SP, randomly decreases as the driving time increases and has a randomly changing value (about 8.0~about 10.0) according to a width of a non-driving period Poff in an initial range of the driving period Pon of the subpixel SP after the non-driving period Poff of the subpixel SP.

When a voltage smaller than or equal to 50% of a maximum value of the data voltage is applied to the black matrix 152 of a metallic material of a liquid crystal display (LCD) device 110 according to a first aspect of the present disclosure, a flicker has a relatively low value (about 2.1) in an initial range of a driving period Pon of the subpixel SP, is saturated to a specific value (about 3.4) as the driving time increases and has a relatively low value (about 2.1) in an initial range of the driving period Pon of the subpixel SP after the non-driving period Poff of the subpixel SP the same as an LCD device having a black matrix of a resin.

When the black matrix 152 of a metallic material of a liquid crystal display (LCD) device 110 according to a first aspect of the present disclosure is grounded (0 V), an image sticking occurs. When a voltage smaller than or equal to 50% of a maximum value of the data voltage is applied to the black matrix 152 of a metallic material of a liquid crystal display (LCD) device 110 according to a first aspect of the present disclosure, an image sticking does not occur the same as an LCD device having a black matrix of a resin.

In the LCD device 110 having the black matrix 152 of a metallic material, a flicker and an image sticking are improved by applying a voltage smaller than or equal to 50% of a maximum value of the data voltage to the black matrix 152.

In another aspect, a transmittance and a luminance may further increase by forming an auxiliary black matrix on the black matrix.

Figure 6:
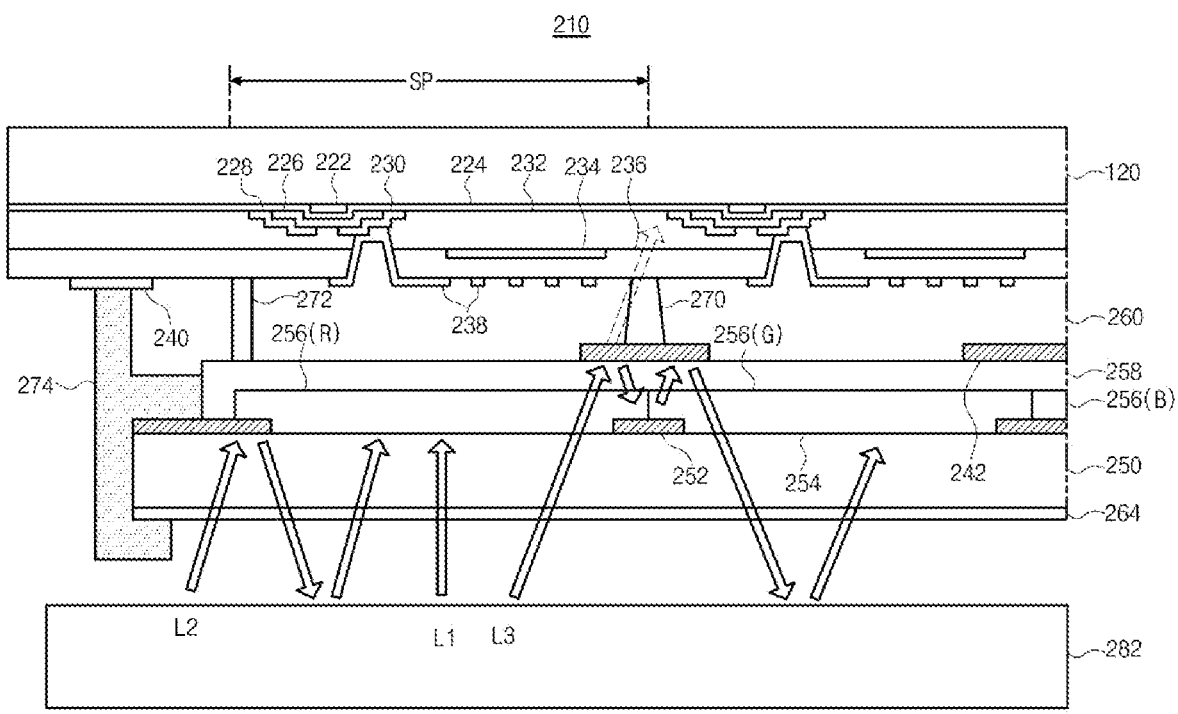
FIG. 6 is a cross-sectional view showing a liquid crystal panel and a backlight unit of a liquid crystal display device according to a second aspect of the present disclosure.

FIG. 6 is a cross-sectional view showing a liquid crystal panel and a backlight unit of a liquid crystal display device according to a second aspect of the present disclosure. Illustration on a part the same as a part of the first aspect will be omitted.

In FIG. 6, a liquid crystal display (LCD) device 210 according to a second aspect of the present disclosure includes a liquid crystal panel displaying an image, a backlight unit 282 under the liquid crystal panel and supplying a light to the liquid crystal panel, and a frame surrounding and supporting the liquid crystal panel and the backlight unit 282.

The liquid crystal panel includes first and second substrates 220 and 250 facing and spaced apart from each other, and a liquid crystal layer 260 between the first and second substrates 220 and 250.

A gate electrode 222 is disposed in each subpixel SP on an inner surface of the first substrate 220, and a gate insulating layer 224 is disposed on the gate electrode 222 and an entire surface of the first substrate 220.

A semiconductor layer 226 is disposed on the gate insulating layer 224 over the gate electrode 222, and a source electrode 228 and a drain electrode 230 are disposed on the semiconductor layer 226. The source electrode 228 and the drain electrode 230 contact both end portions of the semiconductor layer 226 and are spaced apart from each other.

The gate electrode 222, the semiconductor layer 226, the source electrode 228 and the drain electrode 230 constitute a thin film transistor (TFT).

Although not shown, a gate line and a data line are disposed on the inner surface of the first substrate 220. The gate line and the data line cross each other to define a subpixel SP, and the TFT is connected to the gate line and the data line.

A passivating layer 232 is disposed on the TFT and an entire surface of the first substrate 220, and a common electrode 234 of a plate shape is disposed in each subpixel SP on the passivating layer 232.

A planarizing layer 236 is disposed on the common electrode 234 and an entire surface of the first substrate 220, and a pixel electrode 238 of a shape of a plurality of bars is disposed in each subpixel SP on the planarizing layer 236. The pixel electrode 238 is connected to the drain electrode 230 through a contact hole of the planarizing layer 236 and the passivating layer 232.

A common voltage is applied to the common electrode 234, and a data voltage is applied to the pixel electrode 238. As a result, a horizontal electric field is generated between the common electrode 234 and the pixel electrode 238.

A connecting electrode 240 is disposed in an edge portion of the first substrate 220 on the planarizing layer 236.

A black matrix 252 is disposed in a border portion of each subpixel SP on an inner surface of the second substrate 250, and a color filter layer 256 is disposed in a center portion of each subpixel SP on the second substrate 250 and the black matrix 252.

The black matrix 252 may include a metallic material such as chromium (Cr), and the color filter layer 256 may include red, green and blue (RGB) color filters.

An overcoating layer 258 is disposed on the color filter layer 256 and an entire surface of the second substrate 250, and an auxiliary black matrix 242 is disposed in a border portion of each subpixel SP on the overcoating layer 258. The overcoating layer 258 exposes the black matrix 252 in an edge portion of the second substrate 250.

The overcoating layer 258 exposing the black matrix 252 may be formed through forming a photosensitive overcoating material layer by coating a photosensitive overcoating material on an entire surface of the second substrate 250 having the color filter layer 256 and exposing and developing the photosensitive overcoating material layer using a photomask blocking a center portion of the second substrate 250 and exposing an edge portion of the second substrate 250. Alternatively, the overcoating layer 258 exposing the black matrix 252 may be formed through forming an overcoating material layer and a photoresist layer by sequentially coating an overcoating material and a photoresist on an entire surface of the second substrate 250 having the color filter layer 256, forming a photoresist pattern by exposing and developing the photoresist layer using a photomask blocking a center portion of the second substrate 250 and exposing an edge portion of the second substrate 250, and patterning the overcoating material layer using the photoresist pattern as an etch mask.

The auxiliary black matrix 242 may include a metallic material such as chromium (Cr) and may overlap the black matrix 252. In addition, the auxiliary black matrix 242 may have the same shape as the black matrix 252 and may have a greater width than the black matrix 252.

A spacer 270 is disposed on the auxiliary black matrix 242, and a seal pattern 272 is disposed in an edge portion of the second substrate 250 on the overcoating layer 258.

The spacer 270 contacts the planarizing layer 236 on the first substrate 220 to maintain a gap between the first and second substrates 220 and 250, and the seal pattern 272 prevents a leakage of a liquid crystal of the liquid crystal layer 260.

A first polarizing plate is disposed on an outer surface of the first substrate 220. A discharging electrode 264 is disposed on an outer surface of the second substrate 250, and a second polarizing plate is disposed on the discharging electrode 264.

The discharging electrode 264 is connected to the connecting electrode 240 through a connecting pattern 274 to discharge a static electricity generated in a fabrication process, and the connecting pattern 274 contacts a top surface of the black matrix 252 exposed through the overcoating layer 258.

The first substrate 220 is greater than the second substrate 250, and a driving integrated circuit (IC) is disposed on the first substrate 220 exposed outside the second substrate 250. A flexible printed circuit (FPC) connected to the driving IC is disposed in an edge portion of the first substrate 220, and a printed circuit board (PCB) connected to the FPC is disposed on the FPC.

The PCB may include a timing controlling part, and an image data, a gate control signal and a data control signal of the timing controlling part may be transmitted to the driving IC through the FPC. The driving IC may generate a gate voltage using the gate control signal and may supply the gate voltage to the gate line of the liquid crystal panel. The driving IC may generate a data voltage using the image data and the data control signal and may supply the data voltage to the data line of the liquid crystal panel.

The backlight unit 282 may be disposed under the second substrate 250 and may include a light source and an optical sheet. In a direct type, a diffusing sheet may be disposed between the light source and the optical sheet. In an edge type, a light guide plate may be disposed between the light source and the optical sheet, and the optical sheet may include a prism sheet and a diffusing sheet.

In the LCD device 210, a light of the backlight unit 282 is recycled due to the black matrix 252 of a metallic material.

A first light L1 emitted from the backlight unit 282 to a center portion of the subpixel SP between black matrixes 252 passes through the liquid crystal panel and is transmitted to a user at front of the first substrate 220 to be used for an image display.

A second light L2 emitted from the backlight unit 282 to the black matrix 252 in a boundary portion of the subpixel SP is reflected by the black matrix 252 and is transmitted to the backlight unit 282. Next, the second light L2 is reflected by the backlight unit 282 and is transmitted to a center portion of the subpixel SP between the black matrixes 252. Next, the second light L2 passes through the liquid crystal panel and is transmitted to a user at front of the first substrate 220 to be used for an image display.

A third light L3 emitted from the backlight unit 282 to the auxiliary black matrix 242 through the black matrixes 252 is reflected by the auxiliary black matrix 242 and is transmitted to the black matrix 252. Next, the third light L3 is reflected by the black matrix 252 and is transmitted to the auxiliary black matrix 242. Next, the third light L3 is reflected by the auxiliary black matrix 242 and is transmitted to the backlight unit 282. Next, the third light L3 is reflected by the backlight unit 282 and is transmitted to a center portion of the subpixel SP between the black matrixes 252 and between the auxiliary black matrixes 242. Next, the third light L3 passes through the liquid crystal panel and is transmitted to a user at front of the first substrate 220 to be used for an image display.

Since the second light L2 capable of being reflected by the black matrix 152 and dissipated and the third light L3 capable of being reflected by the TFT in absence of the auxiliary black matrix 242 are also used for an image display, a transmittance and a luminance of the LCD device 210 increase. In addition, a power consumption of the LCD device 210 is reduced by reducing a luminance of a light supplied by the backlight unit 282.

In the LCD device 210 having the black matrix 252 of a metallic material, since the voltage smaller than or equal to 50% of a maximum value of the data voltage applied to the pixel electrode 236 for driving the subpixel SP is applied to the black matrix 252, a vertical electric field generated between the black matrix 252 and the pixel electrode 238 is weaken to minimize distortion of a horizontal electric field between the pixel electrode 238 and the common electrode 234. As a result, a light leakage in periphery of the black matrix 252 is minimized to reduce a luminance of an on-black and a contrast ratio increases.

Further, since the connecting pattern 274 contacts a top surface of the black matrix 252 exposed through the overcoating layer 258, a contact area increases to reduce a contact resistance and a voltage is stably applied to the black matrix 252.

Consequently, in the LCD device according to the present disclosure, a transmittance and a luminance increase by recycling a light of the backlight unit due to the black matrix of a metallic material.

In addition, a black luminance decreases and a contrast ratio increases by applying a voltage to the black matrix of a metallic material.

Further, a contact area increases to reduce a contact resistance and a voltage is stably applied to the black matrix by connecting a top surface of the black matrix in the edge portion exposed through the overcoating layer with the connecting pattern.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A liquid crystal display device, comprising:
   first and second substrates facing and spaced apart from each other;
   a liquid crystal layer disposed between the first and second substrates;
   a thin film transistor disposed in a subpixel on an inner surface of the first substrate;
   a pixel electrode connected to the thin film transistor;
   a common electrode generating an electric field with the pixel electrode;
   a black matrix in a border portion of the subpixel on an inner surface of the second substrate, the black matrix including a metallic material, and a voltage applied to the black matrix;
   a color filter layer disposed in a center portion of the subpixel on the black matrix;

a connecting electrode disposed on the inner surface of the first substrate;
a discharging electrode disposed on an outer surface of the second substrate, and
a connecting pattern connecting the connecting electrode and the discharging electrode.

2. The device of claim 1, wherein the voltage applied to the black matrix is greater than or equal to 1 V and smaller than or equal to 50% of a maximum value of a data voltage applied to the pixel electrode.

3. The device of claim 1, further comprising a backlight unit under the second substrate,
wherein a light emitted from the backlight unit to the black matrix is reflected by the black matrix and is transmitted to the backlight unit,
wherein the light is reflected by the backlight unit and is transmitted to the center portion of the subpixel, and
wherein the light passes through the second substrate, the liquid crystal layer and the first substrate.

4. The device of claim 1, further comprising:
an overcoating layer on the color filter layer; and
an auxiliary black matrix in the border portion of the subpixel on the overcoating layer, the auxiliary black matrix including a metallic material.

5. The device of claim 4, wherein the auxiliary black matrix overlaps the black matrix and has a same shape as the black matrix, and
wherein a width of the auxiliary black matrix is greater than a width of the black matrix.

6. The device of claim 4, further comprising a backlight unit under the second substrate,
wherein a light emitted from the backlight unit to the auxiliary black matrix is reflected by the auxiliary black matrix and is transmitted to the black matrix,
wherein the light is reflected by the black matrix and is transmitted to the auxiliary black matrix,
wherein the light is reflected by the auxiliary black matrix and is transmitted to the backlight unit,
wherein the light is reflected by the backlight unit and is transmitted to the center portion of the subpixel, and
wherein the light passes through the second substrate, the liquid crystal layer and the first substrate.

7. The device of claim 1, further comprising
an overcoating layer disposed on the color filter layer.

8. The device of claim 7, wherein the black matrix disposed in an edge portion of the second substrate is exposed through the overcoating layer, and
wherein the connecting pattern contacts a top surface of the black matrix exposed through the overcoating layer.

9. A liquid crystal display device, comprising:
first and second substrates facing and spaced apart from each other;
a liquid crystal layer disposed between the first and second substrates;
a thin film transistor disposed in a subpixel on an inner surface of the first substrate;
a pixel electrode connected to the thin film transistor;
a common electrode generating an electric field with the pixel electrode;
a metallic black matrix disposed in a border portion of the subpixel on an inner surface of the second substrate;
a color filter layer disposed in a center portion of the subpixel on the black matrix;
an overcoating layer disposed on the color filter layer and having a portion to expose the black matrix disposed in an edge portion of the second substrate;
a connecting electrode disposed on the inner surface of the first substrate;
a discharging electrode disposed on an outer surface of the second substrate, and
a connecting pattern connecting the connecting electrode and the discharging electrode.

10. The device of claim 9, wherein the voltage applied to the black matrix is greater than or equal to 1 V and smaller than or equal to 50% of a maximum value of a data voltage applied to the pixel electrode.

11. The device of claim 9, further comprising a backlight unit under the second substrate,
wherein a light emitted from the backlight unit to the black matrix is reflected by the black matrix and is transmitted to the backlight unit,
wherein the light is reflected by the backlight unit and is transmitted to the center portion of the subpixel, and
wherein the light passes through the second substrate, the liquid crystal layer and the first substrate.

12. The device of claim 9, further comprising an auxiliary black matrix in the border portion of the subpixel on the overcoating layer, the auxiliary black matrix including a metallic material.

13. The device of claim 12, wherein the auxiliary black matrix overlaps the black matrix and has a same shape as the black matrix and a width of the auxiliary black matrix is greater than a width of the black matrix.

14. The device of claim 12, further comprising a backlight unit under the second substrate,
wherein a light emitted from the backlight unit to the auxiliary black matrix is reflected by the auxiliary black matrix and is transmitted to the black matrix,
wherein the light is reflected by the black matrix and is transmitted to the auxiliary black matrix,
wherein the light is reflected by the auxiliary black matrix and is transmitted to the backlight unit,
wherein the light is reflected by the backlight unit and is transmitted to the center portion of the subpixel, and
wherein the light passes through the second substrate, the liquid crystal layer and the first substrate.

15. The device of claim 9, further comprising:
a connecting electrode disposed on the inner surface of the first substrate;
a discharging electrode disposed on an outer surface of the second substrate; and
a connecting pattern connecting the connecting electrode and the discharging electrode.

16. A liquid crystal display device, comprising:
first and second substrates facing and spaced apart from each other;
a liquid crystal layer disposed between the first and second substrates;
a thin film transistor disposed in a subpixel on an inner surface of the first substrate;
a pixel electrode connected to the thin film transistor;
a common electrode generating an electric field with the pixel electrode;
a black matrix in a border portion of the subpixel on an inner surface of the second substrate, the black matrix including a metallic material, and a voltage applied to the black matrix; and
a color filter layer disposed in a center portion of the subpixel on the black matrix; and
an auxiliary black matrix in the border portion of the subpixel over the color filter layer, wherein a width of the auxiliary black matrix is greater than a width of the black matrix.

* * * * *